US009858090B2

(12) United States Patent
Chalmers et al.

(10) Patent No.: US 9,858,090 B2
(45) Date of Patent: Jan. 2, 2018

(54) GENERATING CUSTOMIZED ON-DEMAND VIDEOS FROM AUTOMATED TEST SCRIPTS

(71) Applicant: International Business Machines Corporation, Armonk, NY (US)

(72) Inventors: Diane C. Chalmers, Rochester, MN (US); David R. Draeger, Rochester, MN (US); Lee A. Jacobson, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/728,215

(22) Filed: Jun. 2, 2015

(65) Prior Publication Data

US 2016/0360298 A1    Dec. 8, 2016

(51) Int. Cl.
| G06F 9/44 | (2006.01) |
| G06F 3/0484 | (2013.01) |
| G06F 17/30 | (2006.01) |
| H04N 21/232 | (2011.01) |
| H04N 21/2668 | (2011.01) |
| H04N 21/8543 | (2011.01) |
| G06F 9/455 | (2006.01) |

(52) U.S. Cl.
CPC .......... *G06F 9/4446* (2013.01); *G06F 3/0484* (2013.01); *G06F 8/30* (2013.01); *G06F 9/45512* (2013.01); *G06F 17/30784* (2013.01); *H04N 21/232* (2013.01); *H04N 21/2668* (2013.01); *H04N 21/8543* (2013.01)

(58) Field of Classification Search
CPC ........ G06F 9/4446; G06F 3/0484; G06F 8/30; G06F 9/45512; G06F 17/30784; H04N 21/232; H04N 21/2668; H04N 21/8543
See application file for complete search history.

(56) References Cited

U.S. PATENT DOCUMENTS 8,555,253 B2   10/2013  Shufer et al.
2008/0195946 A1*  8/2008  Peri-Glass ............ G06F 9/4446
                                                            715/715

(Continued)

OTHER PUBLICATIONS

"What is Selenium" Selenium Web Browser Automation, printed on May 22, 2015, 3 pages, http://www.seleniumhq.org/.

(Continued)

*Primary Examiner* — Chameli Das
*Assistant Examiner* — Amir Soltanzadeh
(74) *Attorney, Agent, or Firm* — Scully, Scott, Murphy & Presser, P.C.; David Zwick, Esq.

(57) ABSTRACT

Generating customized on-demand videos from automated test scripts is provided. Responsive to receiving a request for an instruction on performing a task on a computer, a database of automated test scripts may be searched to identify a set of test scripts that comprise a set of executable actions associated with the task. An automation test sequence associated with performing of the task is built based on test scripts identified in the searching. The automation test sequence is run on a machine. While the automation test sequence is running on the machine, screen activities of the running automation test sequence are recorded to generate a video, e.g., by running a video capture program.

9 Claims, 3 Drawing Sheets

(56) References Cited

U.S. PATENT DOCUMENTS

| | | |
|---|---|---|
| 2010/0229155 A1* | 9/2010 | Adiyapatham ..... G06F 11/3672 717/124 |
| 2013/0152047 A1 | 6/2013 | Moorthi et al. |
| 2013/0262501 A1* | 10/2013 | Kuchmann-Beauger .................. G06F 17/30958 707/769 |
| 2014/0095931 A1 | 4/2014 | Sadasivam et al. |
| 2014/0149967 A1* | 5/2014 | Deshpande ........... G06F 11/362 717/124 |
| 2015/0067862 A1* | 3/2015 | Yu ......................... H04L 63/145 726/24 |
| 2015/0135158 A1* | 5/2015 | Tenev ................. G06F 11/3684 717/101 |
| 2017/0010903 A1* | 1/2017 | Kidron .................. G06F 9/4446 |

OTHER PUBLICATIONS

"Camtasia Studio" Wikipedia, the free encyclopedia, last modified on May 21, 2015, 5 pages, http://en.wikipedia.org/wiki/Camtasia_Studio.

Office Action dated Jul. 15, 2016 received in U.S. Appl. No. 14/833,881, 21 pages.

Office Action dated Nov. 16, 2016 received in U.S. Appl. No. 14/833,881, 22 pages.

Office Action dated Mar. 22, 2017 received in U.S. Appl. No. 14/833,881, 23 pages.

* cited by examiner

GENERATING CUSTOMIZED ON-DEMAND VIDEOS FROM AUTOMATED TEST SCRIPTS

FIELD

The present application relates generally to computers and computer applications, and more particularly to generation of automated videos.

BACKGROUND

Users of software may no longer have the time or patience to read lengthy step-by-step documentation on how to perform a task on a computer or how to take advantage of that "new" feature associated with a computer or software that was just released, for example. Rather, users may prefer watching short (easily consumable) video demonstrations for performing such tasks, especially considering the growing usage of mobile devices that facilitate video viewing. The more complicated the task, the more likely the user will contact an enterprise's support group to help step them through the process.

On the other hand, developers of the computer tasks or software may not have the time or resources to manually generate videos for every task or the infinite number of scenarios in which the software could be used. This imbalance between video supply and demand can cause an enterprise's support costs to go up and also increase costs caused by funding dedicated teams to manually create these videos.

While "how to" videos may be created for the most common tasks for a company's products, to scale the generation of on-demand "how to" videos using human resources is not practical and sometimes not possible.

BRIEF SUMMARY

A method and system of generating customized on-demand videos from automated test scripts may be provided. The method, in one aspect, may include receiving a request for instruction on performing a task on a computer. The method may also include searching a database of automated test scripts to identify a set of test scripts that comprise a set of executable actions associated with the task. The method may further include building an automation test sequence associated with performing the task based on test scripts identified in the searching. The method may also include running the automation test sequence on a machine. The method may also include, while the automation test sequence is running on the machine, recording screen activities of the running automation test sequence to generate a video, by running a video capture program.

A system of generating customized on-demand videos from automated test scripts, in one aspect, may include a processor and a storage device couple to the processor, the storage device storing a database of automated test scripts. A virtual machine may be running on the processor. The processor may be operable to receive a request for an instruction on performing a task on a computer. The processor may be further operable to search the database of automated test scripts to identify a set of test scripts that comprise a set of executable actions associated with the task. The processor may be further operable to build an automation test sequence associated with performing of the task based on test scripts identified in the searching. The virtual machine may be operable to run the automation test sequence, wherein while the automation test sequence is running on the virtual machine, the virtual machine records screen activities of the running automation test sequence to generate a video, by running a video capture program.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
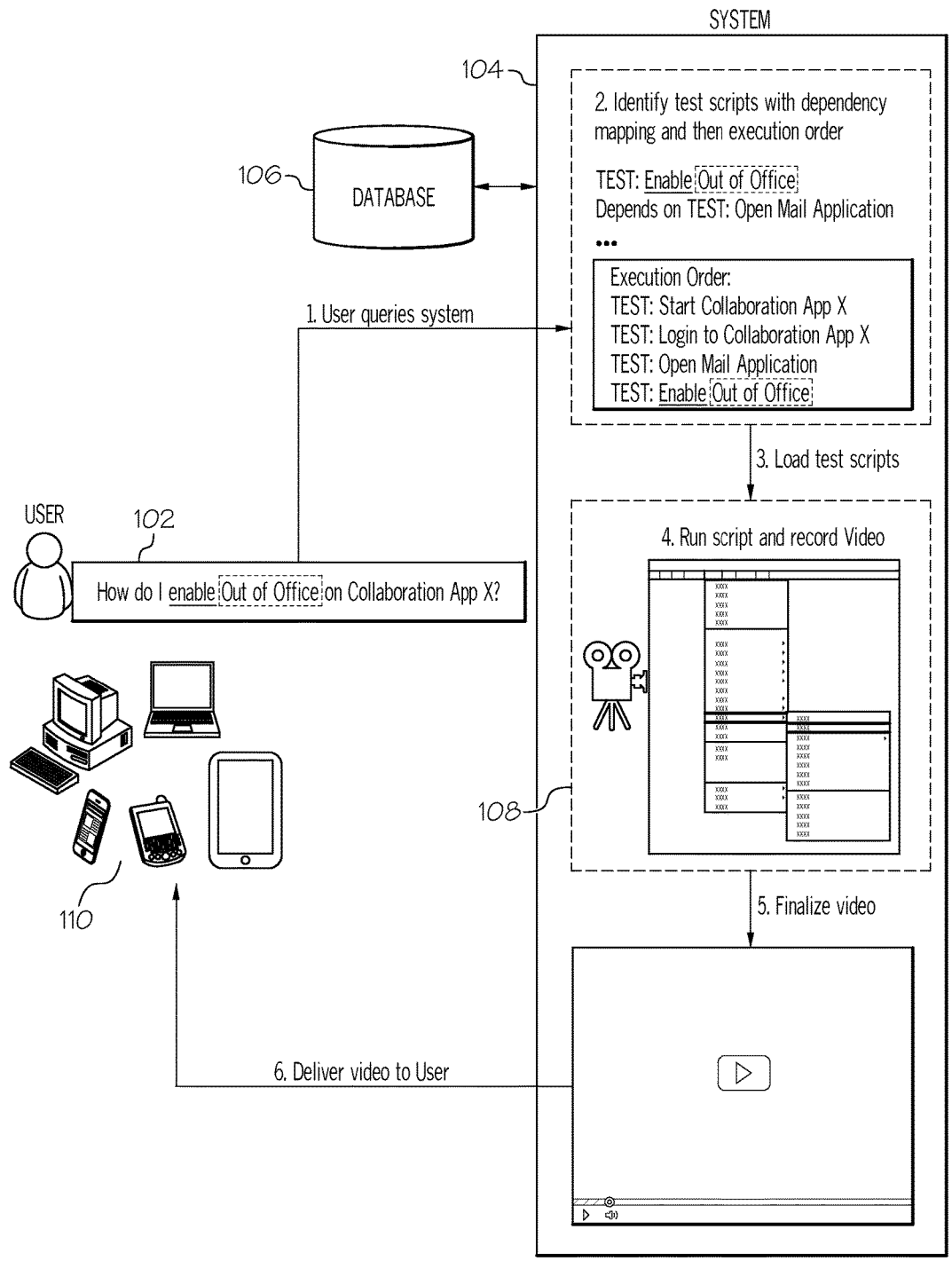
FIG. 1 is a diagram illustrating components of a system that generates a video on demand in one embodiment of the present disclosure.

System, method, and/or techniques are disclosed that create automated videos, for example, "how to" videos from test cases and/or based on test suites. For example, in one embodiment, the system and/or method may generate custom, on-demand videos based on unique user queries. In one aspect, the system and/or method may allow customers to get video demonstrations of how to do anything within a product whether it is a common or a more specialized task. In one aspect, the system and/or method uses no human resource to create manual videos, rather the creation of the videos may be fully automated by a computer or a hardware processor. Techniques for automating a video creation may include leveraging test automation created by a product's test team. In one aspect, an infinite number of videos can be generated according to a methodology or technique of the present disclosure.

The system and/or method of the present disclosure may allow customers to get "how to" help on-demand. An enterprise's support team may use the system and/or method of the present disclosure to generate a "how to" video for a customer. Customers can solve their own problems by watching an on-demand video, for example, without needing to engage a support team. An enterprise's support costs may be reduced because customers can get help through on-demand videos. In one aspect, videos are only created as requested by customers reducing the storage for unnecessary videos or data.

The system and/or method of the present disclosure provide a solution to generate an unlimited or infinite amount of video tutorials for customers without any human authorship needed to create the video content.

Test execution software exists that allow a user to run automated user interface tests for applications. This kind of automation is frequently used during application function verification test (FVT) and system verification test (SVT). These tests exercise the end user functionality of the target application as the end user would use the application. Desktop recording software allows users to record on-screen activity, edit it, and share it as videos. While this type of software allows users to edit their mistakes, creating the final polished video results in costs in extra time and resource.

While traditionally a customer may search and get instructions online to find out how to perform a task, the system and/or method of the present disclosure in one embodiment provide a video as a solution to actually show users.

An example use case scenario is described as follows. A customer uses an enterprise's automatic cognitive system (e.g., automated question and answering system), for example, used to support the enterprise's product or service, to ask a question about the enterprise's product or service. A simple example question may be: "How do I enable 'Out of Office' on the enterprise's email software?" In one aspect, the question may be directed to a specific version of that product. An example of the enterprise's automatic cognitive system is IBM's Watson Engagement Advisor from International Business Machines (IBM) Corporation, Armonk, N.Y. Such cognitive system may invoke the methodology of the present disclosure for automating a video. In another aspect, a user interface coupled to, or associated with, the system and/or method of the present disclosure may receive such question from a user.

The cognitive system or a module associated with the methodology of the present disclosure may search a database of existing automated test scripts. The search returns a sequence of tests to execute that most closely matches what the customer is asking. The degree of matching may be based on a percentage, for example, 70% or higher probability of matching.

In one aspect, there is a bucket of existing automated test scripts that encapsulates the whole set of executable actions for that program (the software or computer product in which the customer or a user has posed a question). Every test case may be componentized at the smallest possible level and annotated to show dependencies between the test cases. For example, dependency is expressed for needing to log in before doing the next step. A module (e.g., that performed the search such as the enterprise's cognitive system or a question and answering system) may return the tests based on key words from the customer question or search and any dependent tests.

The built automation test sequence is run, for example, on an existing Virtual Machine (VM) that has the program in question installed on it. Video capture software is run on that VM while the automation runs to create a video. The generated video may be provided to the customer. The customer watches the video to see how to enable "Out of Office" on the enterprise's email software or product.

In one aspect, the automated tests already exist for products, e.g., software products, and the method and system of the present disclosure may leverage those existing tests, resulting in less effort and cost. Videos of the present disclosure in one embodiment can be generated without human authorship. This allows for an infinite number of custom dynamically generated videos.

FIG. 1 is a diagram illustrating components of a system that generates a video on demand in one embodiment of the present disclosure, for example, as described above. A simple test example may include: Create an e-mail. A multi-test example may include: Create an e-mail AND spellcheck AND Send. A user's question on "how to" may include a sequence of tasks. A development team may have already created a TEST SUITE full of automated test scripts to verify application functionality. Metadata may be documented (e.g., dependencies, description, product, version, etc.) in each of the test scripts to allow them to be indexed and/or searchable against user queries.

A user, for example, via a graphical user interface of the system of the present disclosure in one embodiment may query the system. An example user query may include, "How do I enable Out of Office on Collaboration App X version Y?" 102, for example, entered on the graphical user interface. The Collaboration App X in this example may be an enterprise integration computer product or software that, for example, may include email, messaging, electronic calendar, and other computer-implemented components. The system 104 of the present disclosure in one embodiment identifies test scripts with dependency mapping and then identifies the execution order. For example, the system 104 searches a database of test scripts 106, for example, that are associated with the user's question. The test scripts are loaded onto a test server. A test server may include a virtual machine or another machine. The test server also runs a video capture program or tool. Test scripts are run in their execution order as video is recorded by the video capture program, for example, shown at 108. Video recording is finalized for user consumption.

Video is delivered to the end-user, for example, to the end user's device 110, for example, via a computer network link or direct download, or by another transmission mechanism.

Figure 2:
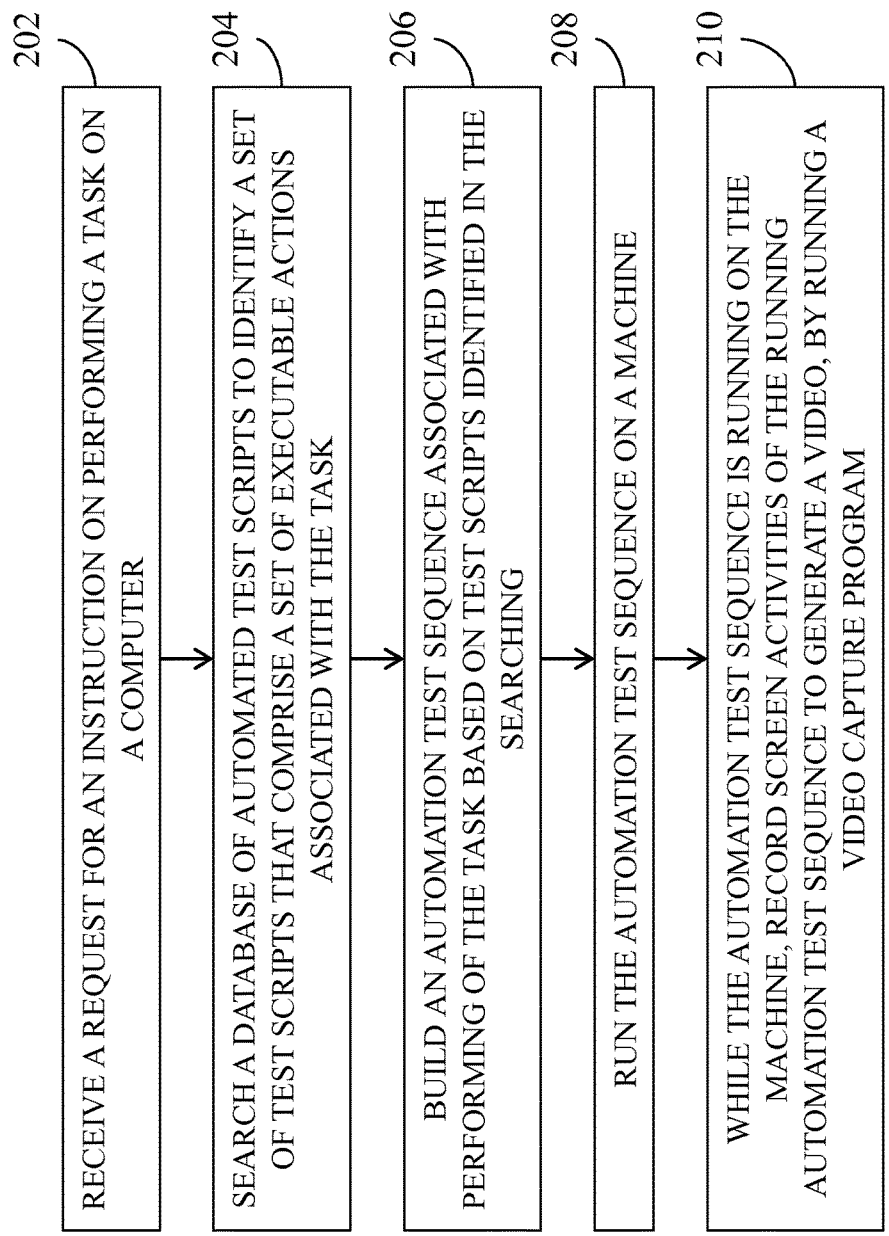
FIG. 2 is a flow diagram illustrating a method of generating a video on demand in one embodiment of the present disclosure.

FIG. 2 is a flow diagram illustrating a method of generating a video on demand in one embodiment of the present disclosure. The method may be performed by one or more processors. At 202, a request is received for an instruction on performing a task on a computer. The request comprises a question from a user asking how to perform the task. The task may include a sequence of tasks.

At 204, a database of automated test scripts is searched to identify a set of test scripts that comprise a set of executable actions associated with the task. The database of automated test scripts may include automated test scripts created to automatically verify a plurality of application functionalities. In one aspect, the automated test scripts may be componentized and have metadata that describes at least dependency, description, product, and version. Searching a database of automated test scripts may include matching keywords and metadata of test scripts with the request and identifying the set of test scripts that is determined to match according to a defined degree of matching.

At 206, an automation test sequence associated with performing of the task is built based on test scripts identified in the searching. Building an automation test sequence may include identifying one or more dependencies in the test scripts and identifying an execution order of the set of test scripts based on dependency mapping among the test scripts. The one or more dependencies may be identified in metadata associated with the test scripts.

At 208, the automation test sequence is run or executed on a machine. In one aspect, the machine may include a virtual machine.

At 210, while the automation test sequence is running on the machine, screen activities of the running automation test sequence are recorded to generate a video, by running a video capture program. For example, the video capture program is executed on the machine to record the screen activities associated with the automation test sequence, for example, presented on a display device as the automation test sequence is executed on the machine. An example of video capture program may include an existing tool that captures screen activities of a display screen coupled to the computer.

Figure 3:
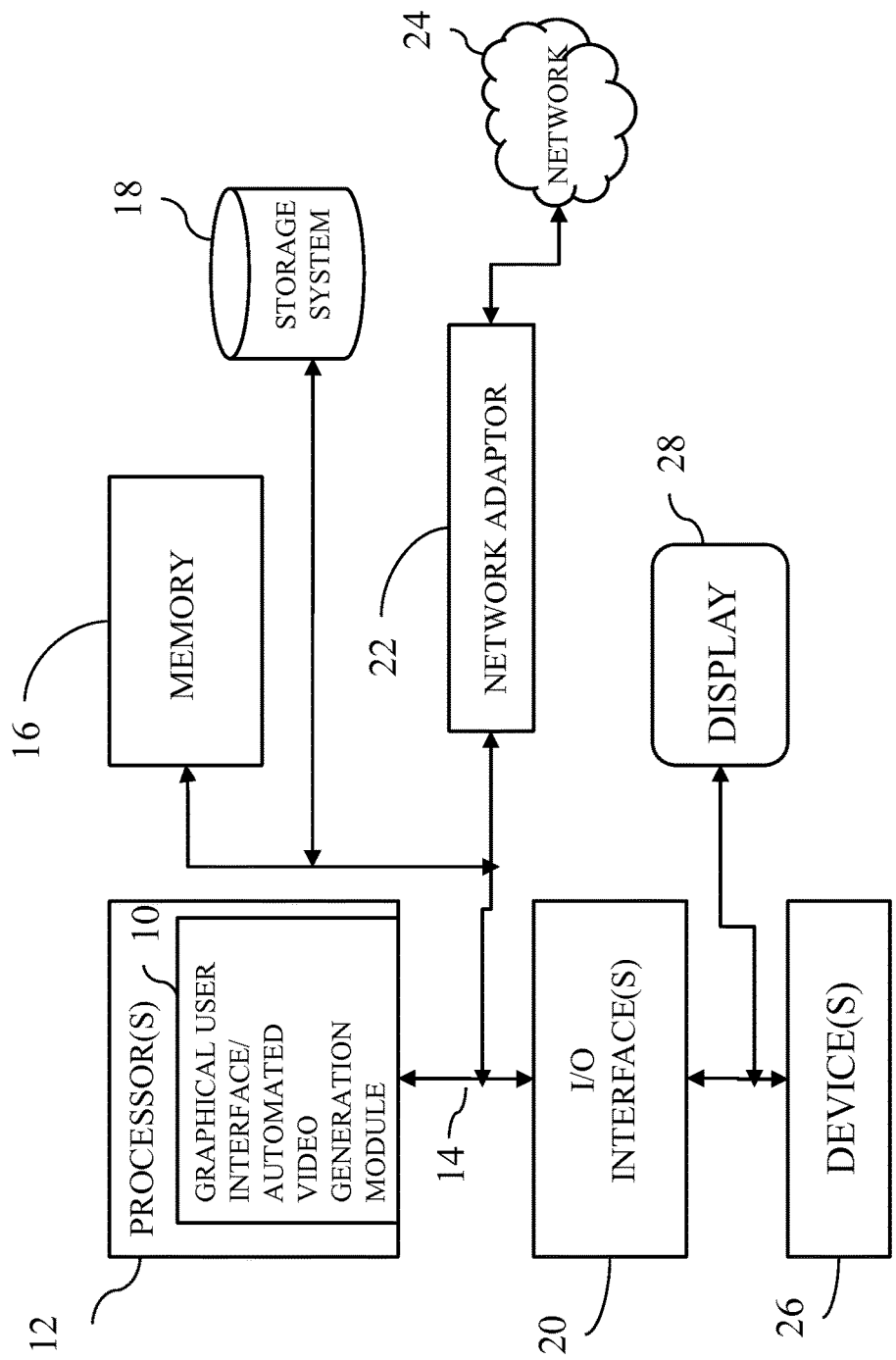
FIG. 3 illustrates a schematic of an example computer or processing system that may implement a video generation system in one embodiment of the present disclosure.

FIG. 3 illustrates a schematic of an example computer or processing system that may implement a video generation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer readable storage medium storing a program of instructions executable by a machine to perform a method of generating customized on-demand videos from automated test scripts, the method performed by one or more processors, the method comprising:

receiving by a cognitive question and answering system that receives a question and automatically provides an answer to the question, a request from a user for an instruction on how to perform a task on a computer;

responsive to receiving the request for the instruction on how to perform the task on the computer, the cognitive question and answering system searching a database of automated test scripts to identify a set of test scripts that comprise a set of executable actions associated with the task;

building an automation test sequence associated with performing of the task based on test scripts identified in the searching, the automation test sequence comprising a sequence of execution steps needed in performing the task on the computer;

running the automation test sequence on a machine;

while the automation test sequence is running on the machine, recording screen activities of the running automation test sequence;

generating an on-demand customized video comprising the screen activities, the customized video generated dynamically responsive to the request; and transmitting the on-demand customized video to the user for showing how to perform the task, wherein a how-to video is created on demand from a test script used during one or more of an application function verification test and a system verification test, wherein the building an automation test sequence comprises identifying one or more dependencies in the test scripts and identifying an execution order of the set of test scripts based on dependency mapping among the test scripts, the one or more dependencies identified in metadata associated with the test scripts.

2. The computer readable storage medium of claim 1, wherein the task comprises a sequence of tasks.

3. The computer readable storage medium of claim 1, wherein the searching a database of automated test scripts comprises matching keywords and metadata of test scripts with the request and identifying the set of test scripts that is determined to match according to a defined degree of matching.

4. The computer readable storage medium of claim 1, wherein the video capture program is executed on the machine.

5. The computer readable storage medium of claim 1, wherein the database of automated test scripts comprises automated test scripts created to automatically verify a plurality of application functionalities.

6. The computer readable storage medium of claim 1, wherein the automated test scripts are componentized and have metadata that describe at least dependency, description, product, and version.

7. The computer readable storage medium of claim 1, wherein the machine includes a virtual machine.

8. The computer readable storage medium of claim 1, wherein the request comprises a question from a user asking how to perform the task.

9. A system of generating customized on-demand videos from automated test scripts, comprising:

a processor; and a storage device couple to the processor, the storage device storing a database of automated test scripts; and a virtual machine running on the processor, the processor operable to receive a request from a user for an instruction on how to perform a task on a computer, responsive to receiving the request for the instruction on how to perform the task on the computer the processor further operable to search the database of automated test scripts to identify a set of test scripts that comprise a set of executable actions associated with the task, the processor further operable to build an automation test sequence associated with performing of the task based on test scripts identified in the searching, the automation test sequence comprising a sequence of execution steps needed in performing the task on the computer, the virtual machine operable to run the automation test sequence, wherein while the automation test sequence is running on the virtual machine, the virtual machine records screen activities of the running automation test sequence and generates an on-demand customized comprising the screen activities, the customized video generated dynamically responsive to the request, the virtual machine further operable to transmit the on-demand customized video to the user for showing how to perform the task, wherein a how-to video is created on demand from a test script used during one or more of an application function verification test and a system verification test, wherein the processor builds the automation test sequence by identifying one or more dependencies in the test scripts and identifying an execution order of the set of test scripts based on dependency mapping among the test scripts, the one or more dependencies identified in metadata associated with the test scripts.

* * * * *